G. W. MacKENZIE.
TOTALIZING METER.
APPLICATION FILED NOV. 1, 1919.

1,413,046.

Patented Apr. 18, 1922.
3 SHEETS—SHEET 1.

Witnesses:
Lois Brueman.
J. M. Geoghegan.

Inventor
George W. Mackenzie
by C. M. Clarke
Attorney

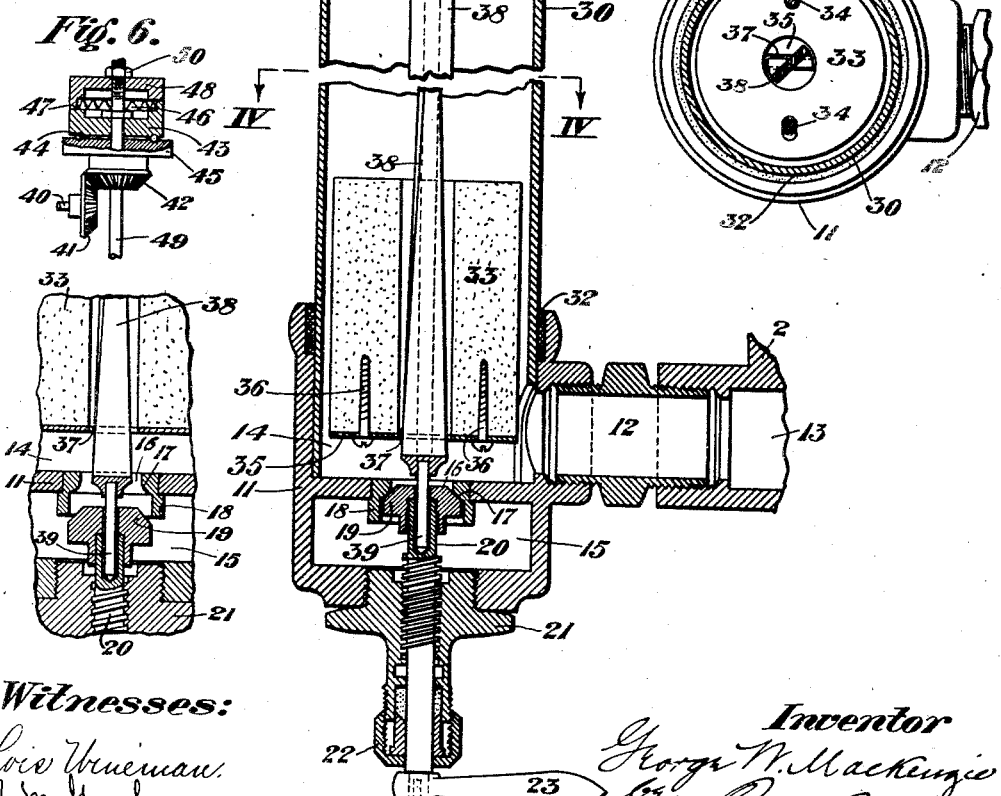

UNITED STATES PATENT OFFICE.

GEORGE W. MacKENZIE, OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

TOTALIZING METER.

1,413,046.   Specification of Letters Patent.   Patented Apr. 18, 1922.

Application filed November 1, 1919. Serial No. 334,943.

*To all whom it may concern:*

Be it known that I, GEORGE W. MACKENZIE, a citizen of the United States, residing at Beaver, in the county of Beaver and State of Pennsylvania, have invented certain new and useful Improvements in Totalizing Meters, of which the following is a specification.

My invention consists of an improvement in totalizing meters for liquid vending machines, and is particularly adapted to the recording of measured quantities of gasoline or the like.

I have shown the invention as used in connection with a machine generally similar to that described in my prior patent dated March 11, 1919, No. 1,297,210, but it will be understood that it is applicable to other machines by making suitable necessary modifications, dependent on the construction or other controlling factors.

The device has in view to utilize a vertically movable float within a chamber in circulating communication with a main measuring vessel, in connection with an outlet valve adapted to control the flow of the measured liquid and a rotatable stem in geared connection with meter dial mechanism, with a clutch for connection and disconnection therewith, and various other features as shall be more fully hereinafter described.

Referring to the drawings showing one preferred embodiment of the invention,

Fig. 3 is an enlarged vertical sectional view of the meter partly broken away similar to Fig. 2;

Fig. 4 is a cross section on the line IV—IV of Fig. 3;

Fig. 5 is a sectional detail view on the line V—V of Fig. 3; and

Fig. 6 is a sectional detail view, partly broken away, similar to Fig. 3, showing the emptying valve opened.

Figure 1:
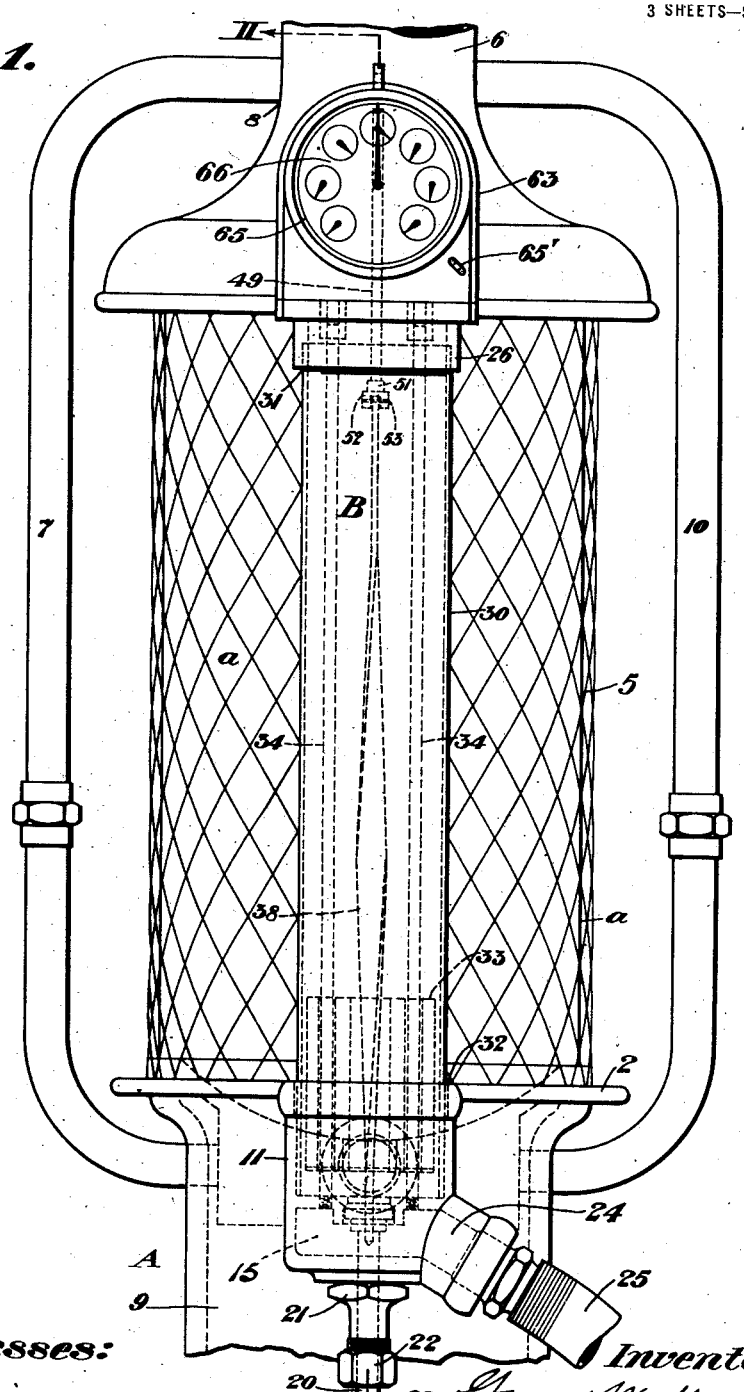
Fig. 1 is a view in front elevation showing the totalizing meter as combined with the measuring machine.

Referring to the measuring machine with which the totalizing meter is used, and with which it operates to measure each quantity of liquid vended therefrom, this apparatus, which is generally indicated by the letter A, is provided at its upper portion with a cylindrical vessel $a$, preferably of glass, hermetically held within surrounding supporting and sealing portions.

The vessel $a$ is adapted to receive fluid from a main reservoir at a lower level by means of an intervening compound telescoping conduit member, as illustrated in the application above referred to, the upper portion of which leads into the central bottom portion of the cylindrical measuring vessel by the said telescoping conduit upwardly within the connection C.

The measuring portion of the device embodying the transparent cylinder $a$ is mounted upon and fitted within a lower base 2 provided with a concave bottom, as shown, and the upper edge of cylinder $a$ is similarly fitted in an upper ring 3, and base 2 and said rings are each provided with an annular groove for receiving the ends of the glass cylinder with intervening suitable packing material 4. The base and top are tightly clamped together by a series of connecting rods and preferably have a surrounding protecting cover 5 of wire netting, expanded metal, or the like.

Upwardly above ring 3 is a coping or top 6 secured to ring 3 by bolts or in any suitable manner. An air suction conduit 7 is connected with the interior of the measuring vessel $a$ through the hollow coping 6, as indicated at 8, and leads downwardly through the supporting base 9 of the machine to a suction pump or other suitable air exhaust mechanism. At the other side, a similar conduit 10 provides means for the various circuit wires utilized in connection with a superimposed lamp and an actuating motor for the pump, not shown.

Liquid is charged into the interior of the measuring reservoir $a$, through the central conduit mechanism within pipe C by the exhaustion of air therefrom through conduit 7 under control of the operator, and it is designed that such amount of liquid at each operation shall be discharged or drained off from the measuring vessel through the base of the totalizing meter, which is generally indicated by the letter B.

Said device is provided with a hollow cylindrical base portion 11 which is connected by nipple 12 and conduit 13 through base 2, with the bottom interior portion of the measuring vessel, establishing communication therewith to the upper interior chamber 14 of the meter.

A lower chambered portion 15 thereof communicates with upper chamber 14 through an intervening opening 16 provided with a valve seat 17 within a downwardly extending valve engaging sleeve 18. A coacting valve 19 is adapted to seat upon and close said valve opening, valve 19 being mounted upon the upper end of a threaded stem 20. Said stem is threaded within a terminal bushing 21 at the lower end of base 11, and is provided with a stuffing box and gland 22 and a terminal actuating handle 23. The threads of stem 20, as shown, are comparatively steep, whereby to provide for a quick opening and closing of valve 19 by a partial rotation of stem 20, as will be readily understood. Base 11 is provided at one side with an outlet conduit extension 24 communicating with lower chamber 15 and having a hose extension 25 by which means the entire contents of the measuring vessel, and of the float chamber of the meter itself, are drawn off for distribution to any suitable point, as the gasoline tank of an automobile.

The upper end of the meter is provided with a terminal supporting base 26, the interior of which is in open communication with the upper interior portion of the measuring chamber by a pipe conduit 27 connected with the lateral chambered portion 28 of base 26 and at 29 with an opening leading inwardly through coping 6. By this means, upon termination of the suction within the measuring chamber and restoration of normal atmospheric pressure through conduit 7, equalization of pressure is provided for between the measuring vessel and the interior of the float cylinder of meter B. Said cylinder 30 may be of glass or metal, and is connected at its top and bottom with bases 26 and 11 respectively, with suitable provision for hermetic sealing, as indicated. Thus, casing 30, as shown, is connected by screw threads 31 at the top to base 26 and at the bottom extends inwardly of base 11 into chamber 41 with suitable packing material 32, providing for any possible movement due to expansion or contraction of the parts.

Figure 2:
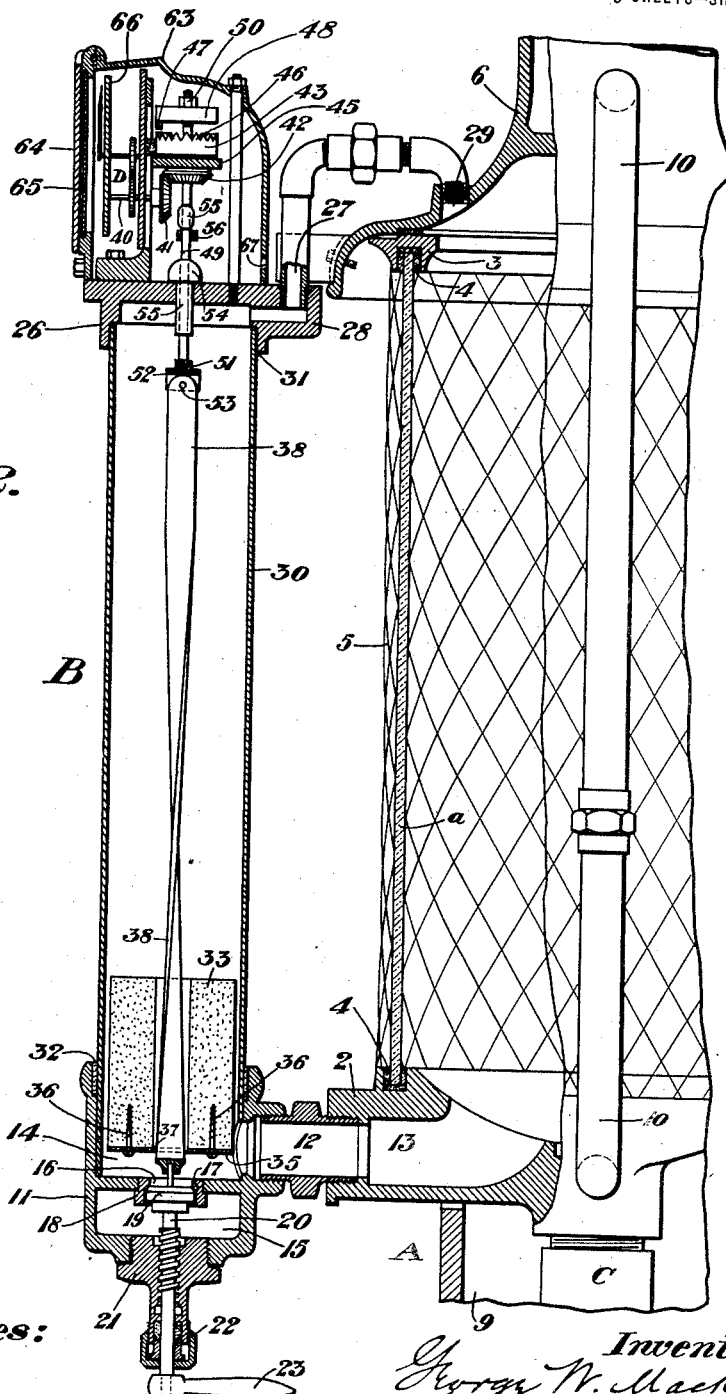
Fig. 2 is a vertical sectional view through the meter and a portion of the measuring machine indicated by the line II—II of Fig. 1.

A buoyant float 33 of cork or other suitable material is mounted within casing 30 upon vertical guide rods 34—34 extending between top and bottom bases 26 and 11, whereby to maintain the float against rotation while permitting it to freely rise and fall with the variable height of liquid in chamber 30, corresponding to the variable height in chamber a. At one end, preferably the lower end, float 33 is provided with a plate 35 secured in any suitable manner, as by screws 36, and having a central transverse slot 37 slidably engaging the spirally arranged rotatable ribbon or blade 38. Said blade is pivotally mounted by stem extension 39 in the upper socketed end of stem 20 for free rotation therein under action of float 33 in rising or falling. The blade 38 is spirally twisted, as indicated in Fig. 2, so as to provide for a one-half rotation thereof by the float in the total range of its vertical travel. The rotation of blade 38, by the float, either for a full one-half rotation corresponding to a complete filling of the measuring tank, or for a proportionately less amount and a correspondingly reduced rotation of the blade, is imparted to the registering mechanism of the meter through suitable gearing common in meter construction, and generally indicated by the letter D. Such gearing is actuated from shaft 40 and bevel gear 41 by driving bevel 42 which is connected with an actuating toothed wheel 43. Said wheel and bevel 42 are provided with ball bearings 44 between them and a bearing plate 45, whereby to facilitate easy movement at all times.

Toothed wheel 43 is provided at its upper edge with a series of annularly arranged V-shaped teeth 46 adapted to be engaged by a similar single tooth 47 of a terminal disk 48. Said disk is fixedly secured at the upper end of a stem 49 by a nut 50, or otherwise, and extends downwardly through base 26 and is connected at 51 with a terminal 52 having riveted or other suitable connection at 53, with the upper end of spiral blade 38. Stem 49 passes downwardly through suitable packing elements 54 and 55, whereby to render the connection through base 26 practically air tight, and with sufficient freedom to easily effect transmission of the rotation of blade 38 to toothed disk 48. Stem 49 is provided with an abutment 55', in range of the forked terminals of a lever 56, pivoted at 57 to upright 58, and connected at its outer end by pivotal joint 59 with stem 60 having a valve 61 closing opening 62 in base 26.

By this means, air is always admitted through port 62 and by conduit 27 to the interior of casing 30 and measuring vessel a for each lowering of stem 49 upon opening valve 19 by handle 23 to empty. In this manner the vacuum is destroyed at each operation, making it necessary to again operate the pump to fill the measuring vessel a with an accompanying closing of valve 19. It is therefore impossible to refill the measuring tank a to again raise float 33, or to reverse the meter by reverse movement of stem 49, because of thus first disconnecting tooth 47 from teeth 46. By this means I ensure constant intermittent rotation of the meter gearing always in the same direction.

As shown, valve seat 17 is provided with the downwardly extending annular sleeve 18 and valve 19 makes a cylindrical sealing or piston fit therein, so that the valve cannot be opened to release liquid by merely unseating it from seat 17, but must be lowered below the sleeve 18 to release the liquid. By this means, teeth 47 and 46 are certain to be fully engaged before the liquid can be withdrawn, so that any inaccuracy due to lost motion or opportunity of fraudulent use of the machine is prevented.

A further advantage is that, before the liquid commences to flow out, valve 19 must be lowered below the lower edge of shell 18 by which time the teeth 47—46 are fully in mesh, so that any oscillation of stem 38 due to the preliminary direct discharge of liquid in casing 30 does not have any effect on the teeth such as it would have if they were open or only partly in mesh. Also, if it is desired to suddenly close valve 19 before the full contents of vessel $a$ and 30 are emptied, this can be done without raising valve 19 to its full height or so high as to entirely uncouple the teeth. In this manner, any vibration of blade 38 in no way affects the teeth or tends to throw tooth 47 out of exact register with its co-acting groove between adjacent teeth 46, and any disturbance of the liquid will terminate before the teeth are fully separated.

The entire working mechanism of the meter above described is enclosed within a suitable casing 63 mounted upwardly above base 26, provided with a hinged cover 64, which may be locked in position by a padlock engaging staple 65', so as to cover and conceal the glass disk 65 in front of the meter dial 66. Said dial is of common well known construction as used in gas or water meters, or the like. Casing 63 is preferably provided with one or more openings 67 leading to the atmosphere whereby to facilitate re-establishment of atmospheric pressure within the interior of casings 30 and $a$ through valve controlled opening 62, as will be readily understood.

The construction and operation will be clear from the foregoing description, and it will be understood that the machine may be changed or varied by the skilled mechanic in various details or otherwise by the skilled mechanic, without departing from the invention, as expressed in the following claims.

What I claim is:

1. Fluid measuring apparatus comprising a float chamber in free circulating communication with a receiving and dispensing chamber and provided with a valve-controlled outlet opening, a valve therefor, registering mechanism, a vertically and rotatably movable element in operative relation to the outlet valve and the registering mechanism respectively, and adapted to be connected and disconnected with the registering mechanism by opening and closing the valve respectively, and a vertically movable float in rotative engagement with said movable element.

2. Fluid measuring apparatus comprising a float chamber in free circulating communication with a receiving and dispensing chamber and provided with a valve-controlled outlet opening, a valve therefor, registering mechanism, a vertically and rotatably movable element having one terminal in operative relation to the outlet valve for raising and lowering and provided at its other end with a clutch portion adapted to engage and disengage the registering mechanism respectively, and a vertically movable float in slidable rotative engagement with said movable element adapted to actuate the movable element inoperatively by rising movement and operatively with the registering mechanism by falling movement when the valve is closed and opened respectively.

3. Fluid measuring apparatus comprising a float chamber in free circulating communication with a receiving and dispensing chamber and provided with a valve-controlled outlet opening, a vertically movable valve therefor, registering mechanism, a freely rotatable vertically movable spiral blade stepped in the outlet valve and having a clutch portion for connection with and disconnection from the registering mechanism upon downward or upward movement of the blade, and a float in the float chamber operatively engaging the spiral blade.

4. Fluid measuring apparatus comprising a float chamber in circulating communication with a receiving and dispensing chamber and provided with a valve-controlled outlet opening, a valve therefor, registering mechanism, a movable element having one terminal in operative relation to the outlet valve and provided at its other end with a clutch portion adapted to engage and discharge the registering mechanism respectively by vertical movement imparted to it by the stem of the outlet valve, and a vertically movable float in slidable engagement with the movable element and adapted to rotate it to a degree corresponding to the vertical movement of the float.

5. In combination with a receiving and dispensing chamber, a fluid measuring apparatus consisting of a vertical casing communicating with the base and top of the dispensing chamber and having a valve seated partition and a lower outlet chamber, a valve in said partition for opening and closing flow therethrough, registering mechanism at the top of the casing provided with a clutch, a slotted float in the casing, a spiral blade provided with a co-acting clutch at its top and rotatably supported in said valve, and a float, in the casing, having slotted sliding engagement with the blade.

6. In apparatus of the class described having a vacuum controlled measuring vessel, the combination with a communicating float casing provided at its top with a valve-seated air-inlet port, of a vertically movable rotatable float-operated clutch-actuating rod extending upwardly through the top of the casing, an abutment thereon, a valve for the air inlet port, and a pivoted lever for the valve mounted upon the casing top and having a portion extending into range of the abutment on the clutch actuating rod, and a fluid outlet valve controlling the flow from the measuring vessel in supporting engagement with the clutch-actuating rod, whereby the air inlet valve is opened and closed in conformity with the opening and closing of the fluid outlet valve.

7. In apparatus of the class described, the combination with a float casing in circulating communication at its base with a measuring vessel and provided with a lowermost outlet chamber, a partition between the interior of the float casing and the outlet chamber, a valve seated bushing in said partition having a downwardly extending annular sleeve, a vertically movable valve therein, and an actuating stem for the valve extending upwardly through the outlet chamber adapted to seat and unseat the valve and by continued movement to lower the sides of the valve away from engagement with the annular sleeve of the valve bushing, substantially as described.

8. In apparatus of the class described, the combination with a float casing in circulating communication at its base with a measuring vessel and provided with a lowermost outlet chamber, a partition between the interior of the float casing and the outlet chamber, a valve seated bushing in said partition having a downwardly extending annular sleeve, a vertically movable valve therein, an actuating stem for the valve extending upwardly through the outlet chamber adapted to seat and unseat the valve and provided with a step box socket, and a vertically movable float stem supported in said socket extending upwardly through the float casing and provided at its top with a clutch member for engagement with a co-acting clutch member of registering mechanism.

9. In apparatus of the class described, the combination with the registering mechanism and gearing therefor, of an actuating clutch member operatively connected with the gearing and provided with a series of teeth, and a float actuated and valve controlled rotatable and vertically movable spindle provided with a clutch member having a tooth adapted to engage between teeth of the actuating clutch member to rotate it when the spindle is lowered and rotated and to be disengaged therefrom when the spindle is elevated.

In testimony whereof I hereunto affix my signature.

GEORGE W. MACKENZIE.